March 17, 1970  C. HOROWITZ  3,501,350
METHOD OF MAKING A SILVER ELECTRODE
Filed April 12, 1967
FIG. 1
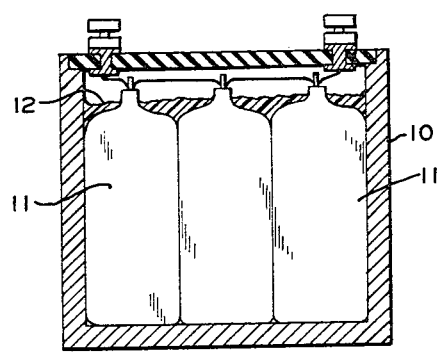
FIG. 2
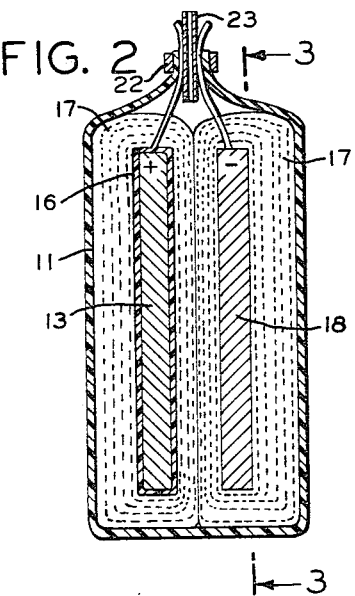
FIG. 3
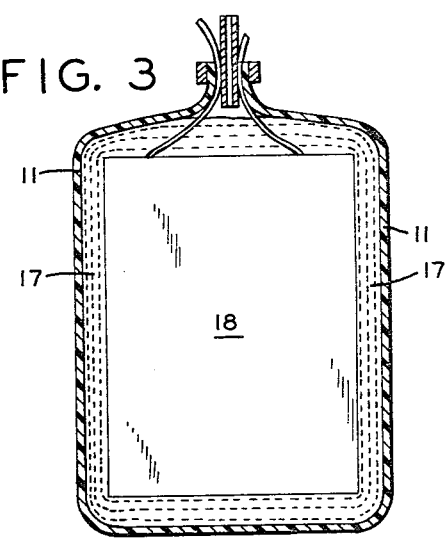
FIG. 4 ZINC OXIDE
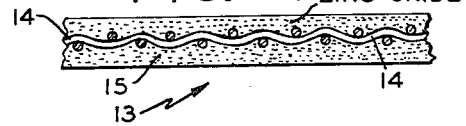
FIG. 5 SILVER POWDER
FIG. 6
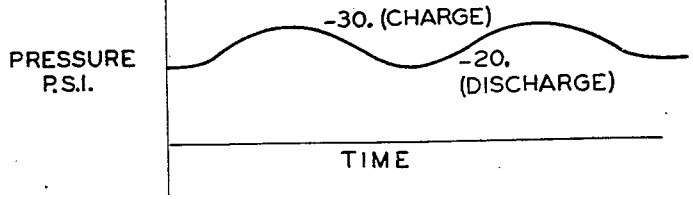
INVENTOR.
CARL HOROWITZ
BY John P. Chandler
HIS ATTORNEY.

United States Patent Office 3,501,350
Patented Mar. 17, 1970

3,501,350
METHOD OF MAKING A SILVER ELECTRODE
Carl Horowitz, 1299 Coney Island Ave.,
Brooklyn, N.Y. 11230
Filed Apr. 12, 1967, Ser. No. 630,430
Int. Cl. H01m 43/02, 13/04
U.S. Cl. 136—20                              1 Claim

ABSTRACT OF THE DISCLOSURE

A zinc-silver storage battery having a positive electrode made of a copper screen plus a layer of pressed zinc oxide. The negative electrode is made of a carbonized vinyl screen plus a layer of pressed sintered silver powder. The electrodes are separated by a film of cellophane and layers of paper. The electrolyte is a water solution of sodium or potassium hydroxide. The cells are packed in a container which keeps the electrodes under pressure.

---

This invention relates to zinc-silver storage batteries having novel electrodes and a means for maintaining the cells and electrodes under equalized pressure. The invention has particular reference to the construction of the electrodes.

Storage batteries using silver and zinc as the electrodes have been used for some time. The positive electrode of these batteries has been made of a conductive base and a covering of zinc oxide. The zinc oxide always appears as a powder and unless special precautions are taken the powder will flake off and fall to the bottom of the container where it is useless. The present invention employs a novel construction which produces a considerable pressure around both electrodes and prevents the dislocation of any part of either electrode. Prior storage batteries of this type used a silver screen for the negative electrode which was packed with silver powder. This construction is quite expensive and the silver powder also tends to flake off and fall to the bottom of the container. The present invention uses a vinyl screen which is charred or carbonized by heat treatment and thereby made conductive. During this heat treatment the silver powder is sintered so that it forms a porous body but the tendency to flake is removed.

The invention includes a flexible envelope made preferably of plastic materials such as polyethylene or "Teflon" for holding both electrodes and the electrolyte. The negative electrode includes a carbonized vinyl screen which has been packed with sintered silver powder. The positive electrode includes a copper screen packed with zinc oxide. The positive electrode is covered with a closely fitting envelope of electrolyte-permeable cellophane or vinyl alcohol derivative. The cellophane covering forms a separator and also helps to maintain the zinc oxide in place. One or more of the flexible polyethylene envelopes are then packed in a rigid container which holds all the components under pressure.

In the drawings:
FIG. 1 is a cross-sectional view of a storage battery showing three cells packed within a rigid container.
FIG. 2 is a cross-sectional view of one of the cells showing the details of construction.
FIG. 3 is a cross-sectional view of one of the cells taken along line 3—3 of FIG. 2.
FIG. 4 is a cross-sectional view of a portion of the positive electrode.
FIG. 5 is a cross-sectional view of a portion of the negative electrode.
FIG. 6 is a graph showing the variation in pressure within a cell as the battery is charged and discharged.

Referring now to the drawings, FIG. 1 shows three cells packed within a rigid container 10 which may be made of metal, high impact molded polystyrene, or Lucite. It is important to have a rigid container because pressure must be maintained on the cells in order to maintain their life. Each cell is covered by an envelope 11 of insulating material such as polyethylene or "Teflon." After the envelopes are placed in rigid container 10, an epoxy resin 12 is poured over the tops of the envelopes to hold them in position.

Referring now to FIG. 2, a single cell is shown before being put into a rigid container. The polyethylene bag 11 contains a positive electrode 13 containing a copper screen 14 surrounded by powdered zinc oxide 15 which has been pressed into shape in a hydraulic press (FIG. 4). The positive electrode is preferably surrounded by cellophane 16 which is sealed after being wrapped entirely around the electrode. Cellophane is permeable to the electrolyte which may be either sodium hydroxide or potassium hydroxide. The electrolyte is a solution in water and may contain from 31 to 44% concentration of alkali. After the cellophane wrapper has been sealed, a few thicknesses of wet strength paper 17 are added. The paper helps to distribute and hold the electrolyte evenly around both electrodes.

A negative electrode 18 (FIG. 5) is first assembled by using a screen made of any one of the various vinyl plastics. A number of these plastic compositions are commercially available and they consist of at least 50% vinyl alcohol. The actual composition of this screen is relatively unimportant since it is later carbonized in a furnace. Silver powder 20 is now applied to the screen and pressed around the screen into a sheet by a hydraulic press. The negative electrode assembly is next put in a furnace where the temperature is raised to about 500 degrees centigrade. This carbonizes or chars the screen and thereby changes it from an insulator to a conductor. This temperature also sinters the silver powder and produces a reasonably strong plate. The plate 18 is now wrapped individually in paper and then both electrodes are inserted into the flexible envelope 11.

Leads for the electrodes can be attached to the copper screen 14 in the positive electrode and connected to the silver powder by soldering in the negative electrode. The electrode conductors are insulated with polyethylene tubing and brought out through the neck of the envelope 11 and then clamped into place by a metal compression seal 22. When the compression seal is made, a capillary plastic tube 23 is inserted into the seal so that the electrolyte may be added after the bag has been inserted into its rigid container. The capillary tube is left open so that gas bubbles may escape during the charge and recharge cycles. The tube 23 may be partially closed by a sponge cork or a valve. In FIG. 2 the cellophane covering is shown surrounding the positive electrode since this is the preferred position. However, the cellophane covering may be put on the negative electrode if desired. A film of polyvinyl alcohol may be used instead of the cellophane.

FIGS. 4 and 5 show the details of the positive and negative electrodes. Instead of the woven screens as shown in these figures, flat perforated plates may be used. It has been found, however, that the powdered material adheres better to the woven screen. The vinyl screen 21 is first given a minor heat treatment in order to eliminate all moisture and other fluids. After the silver powder has been pressed around the screen material there are enough voids in the powder mass to permit the escape of the gases and liquids when the screen is charred by the application of heat.

After the envelopes 11 have been installed in the rigid container 10 the electrolyte is added and the assembly is set aside for several hours to permit the cellophane and paper to absorb the electrolyte completely and to enlarge in volume to a small extent. This latter action creates a pressure within the rigid container which is equalized between all the cells since they are all enclosed in flexible envelopes and since they are all in contact with each other. The pressure within an uncharged bag may reach 20 pounds per square inch. After standing for about 12 hours, the battery is charged in the usual manner by the application of direct current. During the charging cycle the pressure within the envelopes may reach a value of 30 pounds per square inch.

A fully charged battery cell has a voltage of 1.86 volts and it should be charged to a value of 2.14 volts. On discharge, the voltage drops very fast for the first few minutes and then reaches a value of 1.59 volts. The plateau voltage is maintained during discharge until the end of the period at which time the voltage drops very rapidly.

From the above description, it is evident that the assembly of a plurality of storage cells, each in a flexible plastic envelope, causes the pressure within the envelope to equalize throughout the entire battery portion housed in a single rigid container. The equalization of the pressure helps maintain the zinc oxide material in position on the positive electrode and lengthens the life of the battery.

The foregoing disclosure and drawings are merely illustrative of the principles of this invention and are not to be interpreted in a limiting sense. The only limitations are to be determined from the scope of the appended claim.

The embodiments of the invention in which an exclusive property or privilege is claimed are defined as follows:

1. The method of forming an accumulator electrode which includes the following steps: pressing a quantity of silver powder on both sides of a screen of vinyl plastic having at least 50% by weight of vinyl alcohol thereby forming an agglomerate; placing the screen with its silver powder in a furnace and applying heat which carbonizes the plastic for producing a low resistance element and, at the same time sintering the silver powder to form an integral unit electrode.

References Cited

UNITED STATES PATENTS

| | | | |
|---|---|---|---|
| 3,071,637 | 1/1963 | Horn et al. | 136—122 |
| 3,258,363 | 6/1966 | Lieb | 136—122 |

ALLEN B. CURTIS, Primary Examiner

C. F. LEFEVOUR, Assistant Examiner

U.S. Cl. X.R.

136—122